United States Patent
Benkovich et al.

(10) Patent No.: US 11,929,969 B2
(45) Date of Patent: Mar. 12, 2024

(54) SYSTEM AND METHOD FOR IDENTIFYING SPAM EMAIL

(71) Applicant: AO Kaspersky Lab, Moscow (RU)

(72) Inventors: Nikita D. Benkovich, Moscow (RU); Dmitry S. Golubev, Moscow (RU); Roman A. Dedenok, Moscow (RU); Andrey A. But, Moscow (RU)

(73) Assignee: AO Kaspersky Lab, Moscow (RU)

( * ) Notice: Subject to any disclaimer, the term of this patent is extended or adjusted under 35 U.S.C. 154(b) by 491 days.

(21) Appl. No.: 16/673,049

(22) Filed: Nov. 4, 2019

(65) Prior Publication Data
US 2021/0021553 A1 Jan. 21, 2021
US 2023/0342482 A9 Oct. 26, 2023

(51) Int. Cl.
H04L 29/06 (2006.01)
G06F 18/22 (2023.01)
G06F 21/53 (2013.01)
G06F 21/62 (2013.01)
G06N 20/00 (2019.01)
H04L 51/212 (2022.01)

(52) U.S. Cl.
CPC .......... *G06F 21/6209* (2013.01); *G06F 18/22* (2023.01); *G06F 21/53* (2013.01); *G06N 20/00* (2019.01); *H04L 51/212* (2022.05)

(58) Field of Classification Search
CPC . G06F 21/53; G06F 21/6209; H04L 63/1433; H04L 63/145; H04L 63/20; H04L 63/1416
USPC ............................................................. 726/1
See application file for complete search history.

(56) References Cited

U.S. PATENT DOCUMENTS

| | | | | |
|---|---|---|---|---|
| 7,543,053 | B2* | 6/2009 | Goodman | H04L 51/12 709/224 |
| 8,103,727 | B2* | 1/2012 | Lin | H04L 63/126 709/206 |
| 9,647,975 | B1* | 5/2017 | Dedenok | H04L 51/12 |
| 2002/0035607 | A1* | 3/2002 | Checkoway | H04L 29/06 709/206 |
| 2018/0131645 | A1* | 5/2018 | Magliozzi | G06F 40/30 |

* cited by examiner

*Primary Examiner* — Longbit Chai
(74) *Attorney, Agent, or Firm* — ArentFox Schiff LLP; Michael Fainberg

(57) ABSTRACT

Disclosed herein are systems and method for spam identification. A spam filter module may receive an email at a client device and may determine a signature of the email. The spam filter module may compare the determined signature with a plurality of spam signatures stored in a database. In response to determining that no match exists between the determined signature and the plurality of spam signatures, the spam filter module may placing the email in quarantine. A spam classifier module may extract header information of the email and determine a degree of similarity between known spam emails and the email. In response to determining that the degree of similarity exceeds a threshold, the spam filter module may transfer the email from the quarantine to a spam repository.

15 Claims, 6 Drawing Sheets

SYSTEM AND METHOD FOR IDENTIFYING SPAM EMAIL

CROSS-REFERENCE TO RELATED APPLICATION

This application claims benefit of priority under 35 U.S.C. 119(a)-(d) to a Russian Application No. 2019122433 filed on Jul. 17, 2019, which is incorporated by reference herein.

FIELD OF TECHNOLOGY

The present disclosure related to the field of information technology (IT) security, and, more specifically, to systems and methods of identifying spam email.

BACKGROUND

Spam is a mass mailing of information of an advertising nature or other kinds of messages without the consent of a user. At present, every possible technical means is actively being used for the mailing of spam, including proxy servers, free email servers enabling an automated sending of letters by electronic mail, and also infected computer systems of users which are used to form bot networks (botnets).

Electronic mail containing spam is a serious problem in the modern world, since it already reaches 70-90% of the total volume of email traffic. Such a volume of spam sent through computer networks is causing serious inconveniences to the users of electronic mail. In particular, spam causes a deterioration of the bandwidth of the networks, a waste of the resources of the message exchange system, and increased processing time for email both by users and by computers. Thus, it is necessary to constantly fight against spam.

Two main approaches already exist for the detection of spam: a signature-based approach and a machine learning-based approach.

The signature-based approach makes use of spam traps. An email arriving in such a trap is automatically considered to be spam. The spam is broken down into parts, and signatures are formed from the subsets of these parts. The signatures make possible a strict (or almost strict) "catching" of what has been found in the spam traps on the computer systems of the users. The virtue of this approach is practically zero chance of occurrence of errors of the first kind, i.e., false positives. A false positive in the present case is a situation in which a legitimate email is determined to be spam. The drawback is the deficient generalizing ability of this method, so that spam emails get through (i.e., errors of the second kind). Moreover, this approach has a time lag (from several minutes to an hour) between the event when the email ends up in the trap and the production of a new signature, thus causing the problem of overlooking spam emails belonging to "fresh" spam mailings.

In the machine learning-based approach, one uses a collection of spam emails versus a collection of non-spam emails. The emails are broken down into parts, from which those parts are excluded which occur in both collections. The remaining parts are used to teach a classifier, making it possible to detect spam emails not only from spam traps. The virtue of this approach is its high generalizing ability, which minimizes the amount of spam emails being overlooked. However, a drawback of the machine learning-based approach is a higher probability of false positives.

Thus, there is a need to create a solution to eliminate the indicated drawbacks. The present disclosure is able to solve the indicated drawbacks and problems by realizing an approach based on a generalization of a signature verdict with the aid of methods of machine learning.

SUMMARY

Aspects of the disclosure relate to the field of data security. In particular, aspects of the disclosure describe methods and systems for spam identification. One technical result of the disclosure is to reduce the number of omissions of spam emails. This is achieved by sending an email to quarantine for a sufficient time, thus producing a corresponding signature (in the event that the email is spam). The selection of emails that will be sent to a spam repository from the quarantine is made by analyzing the header fields of the emails, the analyzing being performed on the basis of a large volume of data comprising emails from users that have been processed with the use of machine learning methods. Yet another technical result of the present invention is to increase the arsenal of technical means for recognizing emails as spam.

In one exemplary aspect, a method for spam identification comprises a spam filter module and a spam classifier module implemented in a device (e.g., a client device or a server) by a processor. A spam filter module may receive an email at a client device and may determine a signature of the email. The spam filter module may compare the determined signature with a plurality of spam signatures stored in a database. In response to determining that no match exists between the determined signature and the plurality of spam signatures, the spam filter module may placing the email in quarantine. A spam classifier module may extract header information of the email and determine a degree of similarity between known spam emails and the email, using a machine learning method (e.g., a neural network) configured to generate the degree of similarity based on the header information. In response to determining that the degree of similarity generated by the spam classifier module exceeds a threshold, the spam filter module may transfer the email from the quarantine to a spam repository such that the email is inaccessible to a user of the client device.

In one aspect, in response to determining that the degree of similarity does not exceed the threshold, the spam filter module may remove the email from the quarantine.

In one aspect, the spam filter module may determine an amount of time to keep the email in the quarantine, wherein the amount of time is proportional to the degree of similarity.

In one aspect, in response to determining that (1) an additional spam signature has been added to the database comprising the plurality of spam signatures and (2) the amount of time to keep the email in the quarantine has not expired, the spam filter module may compare the determined signature with the additional spam signature. In response to determining a match between the determined signature and the additional spam signature, the spam filter module may transfer the email from the quarantine to the spam repository.

In one aspect, in response to determining that the amount of time to keep the email in the quarantine has expired, the spam filter module may remove the email from quarantine.

In one aspect, the header information comprises a value of at least one header of the email and a sequence of the at least one header.

In one aspect, the at least one header comprises Message_ID and X_mailer.

In one aspect, the machine learning method (e.g., a neural network) is trained to determine the degree of similarity using a first set of emails classified as being caught by spam signatures and a second set of emails classified as not caught by spam signatures.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Figure 1:
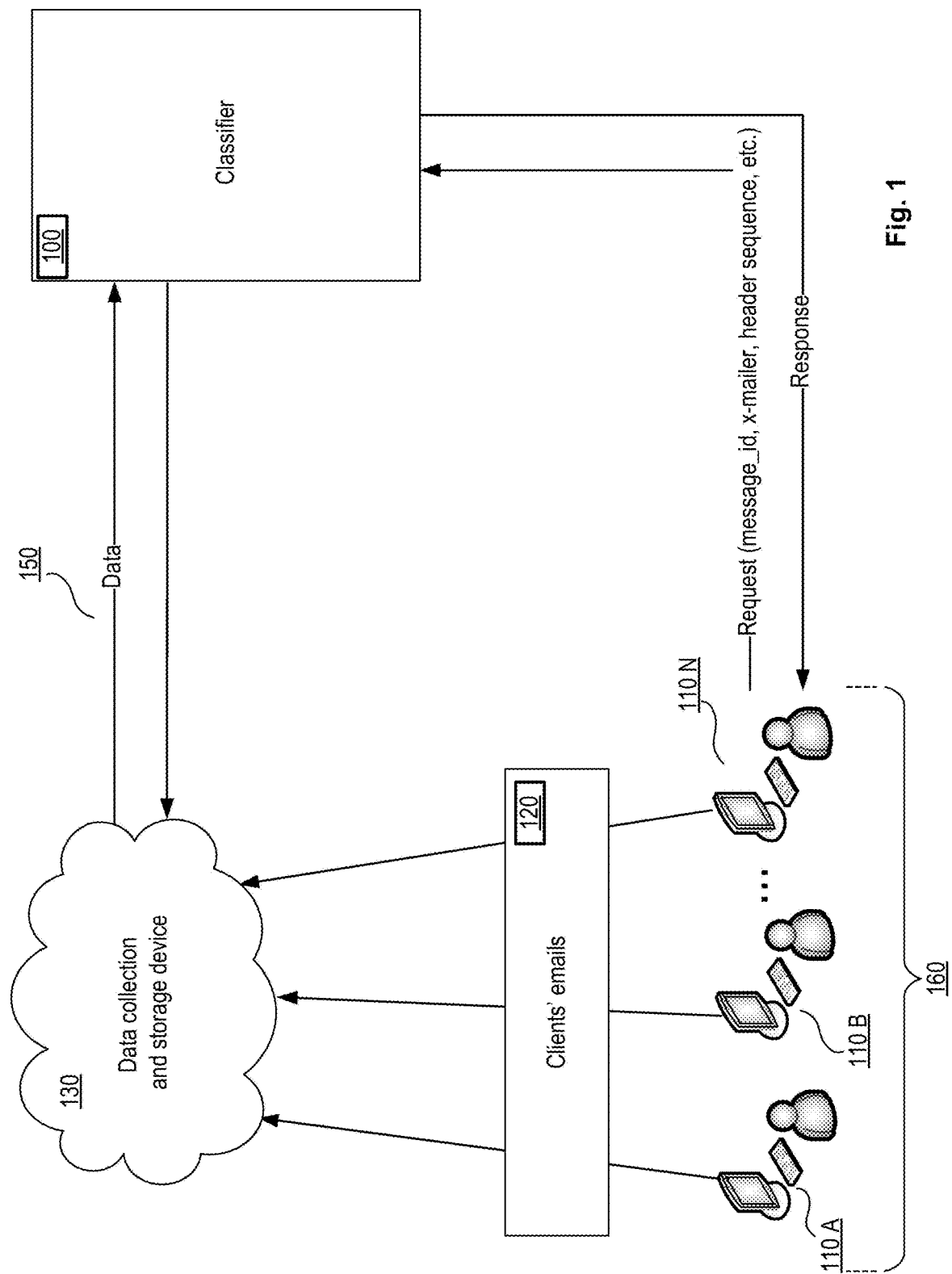
FIG. 1 illustrates the high-level architecture of the system realizing the method for recognizing an email as spam.

Exemplary aspects are described herein in the context of a system, method, and computer program product for spam identification. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

An electronic mail (hereafter, also an email) has a certain structure. Therefore, special programs supporting the structure of email are used to compose the email. Besides the body, the email contains headers (or fields), which represents service information on the route taken by the email in a computer network comprising various email servers. The headers present data as to when, from where, and by what route the email has arrived, and also information added to the email by various service programs. Each header is defined by a name and a value. The value of a header is the particular kind of information. For example, for a header designed to indicate the sender of the email, the name may be "from", and the value may be the email address of the sender, such as "username@domain.com." Other types of the header may be for example, "Message_ID" and "X-mailer".

"Message_ID" is a unique identifier of the email that is assigned to each email, most often by the first email server encountered along its route. In some embodiments, the unique identifier has the form "a1B0!#@domen.ru", where "a1b0!#" may be any given set of characters, often meaningless, while the second part is the name of the machine (e.g., the email server) assigning the identifier. Sometimes, though rarely, "a1b0!#" includes the name of the sender. If the structure of the identifier is disrupted (e.g., the identifier includes a blank line or no character @), the second part of the identifier is not of an authentic source (e.g., a real Internet resource). This means that the email or the structure, although correct, is not typical of the overwhelming majority of email services, and is a probable fake (in order to make spam appear as a normal email).

"X-mailer" or "mailer_name" is a free field in which the email program or service used to create the given email identifies itself, for example, "Outlook 2.2 Windows". The value of this header and the other headers discussed previously, whether considered alone or in combination, may indicate that an email belongs to spam.

As mentioned above, headers are added to an email as the passes along its route in the computer network from a sender to a recipient. The sequences of headers (the parts of the headers) as well as the values of certain individually considered headers may be used to categorize emails as spam.

Examples of data are presented below in the format "Sequence of headers; value of the header "X-mailer;" value of the header "Message_ID," for emails that are spam and for emails that are not spam.

Spam:
1. "content-type:date:from:subject:to:message-id:"; "none"; "<i3mbd6v4vhjsdcmi-zu60opfkwplxb44x-37-6f8d@homesolrrebtes.icu>"
2. "content-type:date:from:subject:to:message-id:"; "none"; "<h5bds3kpswnk0ds0-oalwbjt3dtlcvhlv-2e-19550@homesolrrebtes.icu>"
3. "content-type:date:from:subject:to:message-id:"; "none"; "<yo8j0xsjsdryxywv-ie41tpc7xle0b3no-26-c36d@homesolrrebtes.icu>"
4. "content-type:date:from:subject:to:message-id:"; "none"; "<7enbb9h6c2vapnhr-na5nlwg42raodhr7-2e-4febe@homesolrrebtes.icu>"
5. "message-id:from:to:subject:date:content-type:x-mailer:"; "Microsoft Outlook Express 6.00.2900.2316"; "<D2DDF9E326F6C73C33170DC81829D2DD@8II5L3SPI>"
6. "message-id:from:to:subject:date:content-type:x-mailer:"; "Microsoft Outlook Express 6.00.2900.2180"; "<D98EBBF7F3ECC2BFE8DD91958AA4D98E@L0773DI>"
7. "message-id:from:to:subject:date:content-type:x-mailer:"; "Microsoft Outlook Express 6.00.2900.2180"; "<F90CED31F818D024D130EC25C50DF90C@7TMANVQ>"
8. "message-id:from:to:subject:date:content-type:x-mailer:"; "Microsoft Outlook Express 6.00.2900.5512"; "<311476D62A53B48AAFCD6D91E80F3114@VX18OHGV>"

Not Spam:
1. "content-type:date:from:subject:to:message-id:"; "none"; "<3c8b3b43089c02b53b882aa9ae67f010@acmomail3.emirates.net.ae>"
2. "content-type:date:from:subject:to:message-id:"; "none"; "<3c8b3b43089c02b53b882aa9ae67f010@acmomail3.emirates.net.ae>"
3. "content-type:date:from:subject:to:message-id:"; "none"; "<3c8b3b43089c02b53b882aa9ae67f010@acmomail3.emirates.net.ae>"
4. "content-type:date:from:subject:to:message-id:"; "none"; "<3c8b3b43089c02b53b882aa9ae67f010@acmomail3.emirates.net.ae>"
5. "from:to:subject:date:message-id:content-type:x-mailer:"; "Microsoft Office Outlook 12.0"; "<006b01d51986$06411be0$12c353a0$@domroese@evlka.de>"
6. "from:to:subject:date:message-id:content-type:x-mailer:"; "Microsoft Outlook 15.0"; "<!&!AAAAAAAAAAAYAAAAAAAAAEuD2rCFvsdIgBF3v59c6PrCgAAAEAAAAD+/2KYKE3pHiClPnnSDdSk"
7. "from:to:subject:date:message-id:content-type:x-mailer:"; "Microsoft Outlook 15.0"; "<!&!AAAAAAAAAAAYAAAAAAAAAEuD2rCFvsdIgBF3v59c6PrCgAAAEAAAAJCLHZRUOflDoROPaFfOwCk"

Looking at the examples of data taken from the emails assigned to the two categories, namely, spam and not spam, it becomes understandable that the attributes of such data are not immediately distinguishable to enable an identification of spam. However, this can be done with the use of methods of machine learning—in particular with the use of methods of deep learning, which are able to detect dependencies hidden from the human eye.

FIG. 1 presents an exemplary architecture of a system realizing the method of recognizing an email as spam for a group of computer systems 160. This system includes the mentioned group of computer systems 160, classifier 100 and a data collection and storage device 130.

The data collection and storage device 130 in one variant embodiment is a "cloud"; server, which may perform the gathering and saving of data about emails 120 from clients of users 110A, 110B, . . . 110N. A "cloud";server is meant to be, for example, a technical device containing the system Kaspersky Security Network (KSN) of the company AO Kaspersky Lab. Clients 110A, 110B, . . . , 110N are email clients of users installed on the group of computer systems 160, which includes both the computers of the users and the email servers. It should be noted that the device 130 during the gathering of data about the emails of the clients may not collect information pertaining to the user or may anonymize such information so that the user is not identified uniquely from that information. Such information is information from the body of the email, such as text messages of users, and from the header of the email, such as the electronic address. Anonymization is the transformation of information, for example with the aid of convolutions, including those performed with the aid of hash functions, asymmetrical encryption, and so forth, to hide the user's identity. For this, each client 110 contains an agent (not shown in FIG. 1), which transforms (e.g., anonymizes) an email before sending it to the data collection and storage device 130.

In the present disclosure, device 130 may gather and save, in its original form (i.e., not transformed), for each email from clients 110A, 110B, . . . 110N, at least one of (1) the values of at least two headers, "Message_ID";and "X-mailer", (2) the sequence of at least part of the headers, and (3) the category of the email corresponding to the fields (e.g., spam, not spam) as determined by spam filter 220 (see FIG. 2)—a description of which will be presented below. This gathered data 150 may be sent by device 130 to classifier 100, which uses it within the methods of machine learning to make a decision on whether to place the email in quarantine.

Placing an email in quarantine is a measure of temporary removal of an email whose verification as "spam" or "not spam" is not yet finished. The quarantine may be in an isolated server or a portion of the client 110A, B, etc., that is usually inaccessible to the user. This is done to restrict access to that email by a user of client 110A, B, etc. The time spent by the email in quarantine is limited, usually being a few minutes, due to the aforementioned time lag or waiting for a response from the anti-spam protection systems in the prior art. A email in quarantine recognized as being spam is removed or moved to a spam repository (i.e., a location, such as a server, different from the quarantine that prevents the email classified as spam from affecting client 110A, B, etc.). Otherwise, the email is returned to the client 110N and becomes accessible to the user.

Figure 2:
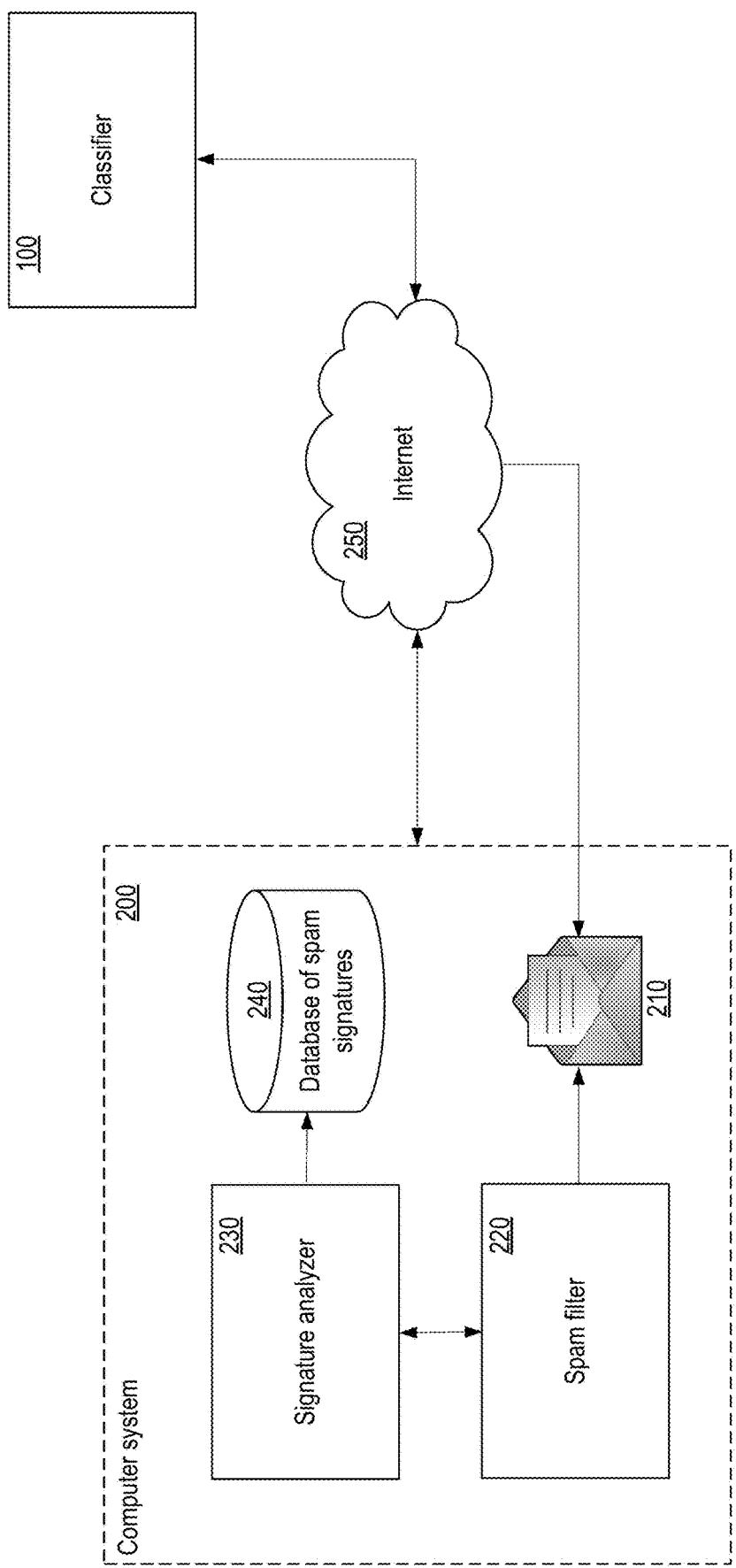
FIG. 2 shows an example of the system realizing the method for recognizing an email as spam.

FIG. 2 shows a particular variant of the system realizing the method of recognizing an email as spam inside one computer system 200 from the group of computer systems 160.

Figure 6:
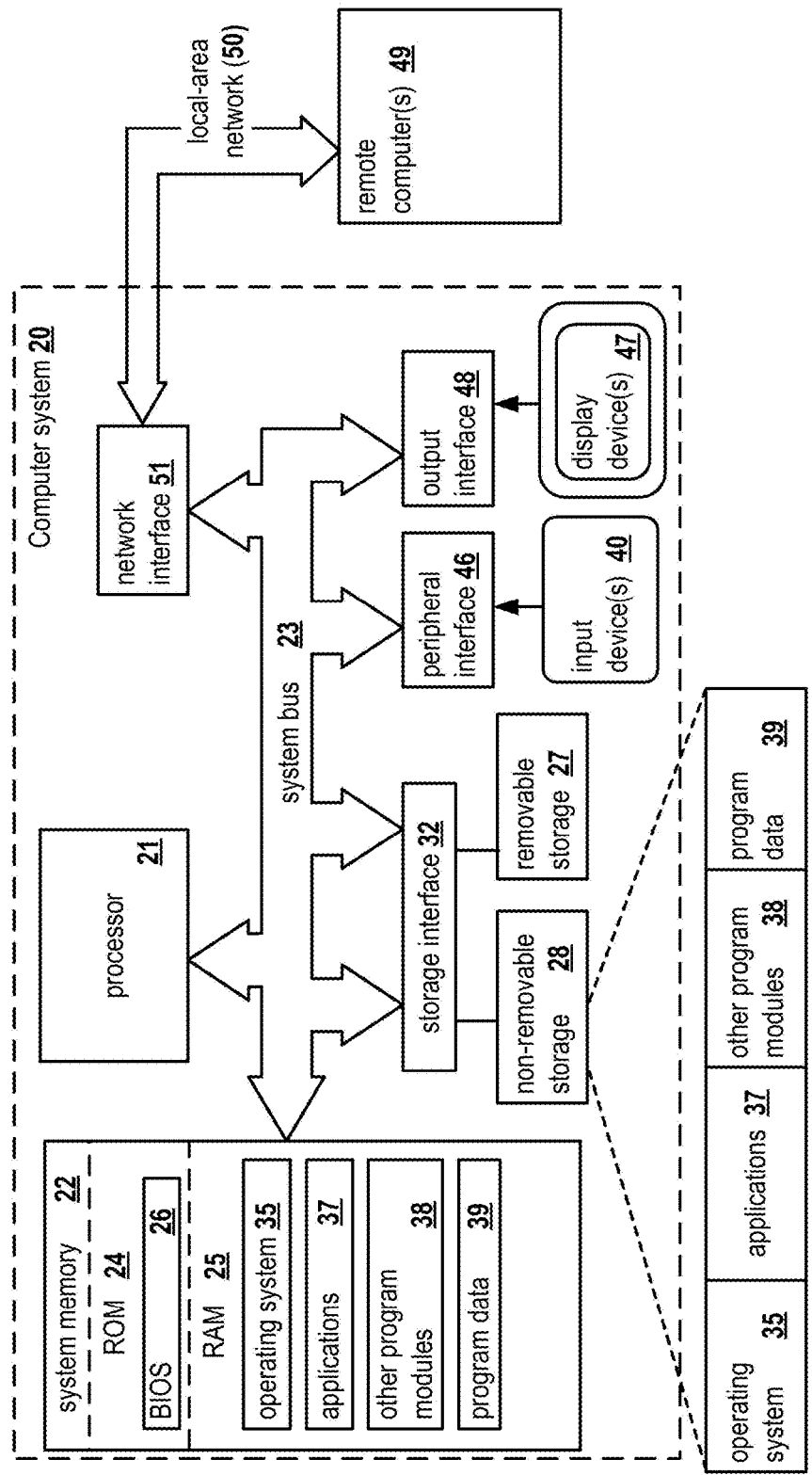
FIG. 6 presents an example of a general-purpose computer system on which aspects of the present disclosure can be implemented.

In one aspect, the system of FIG. 2 includes a computer device 200 (e.g., the general-purpose computer shown in FIG. 6, or a particular variant of a general-purpose computer such as a mobile device). Computer device 200 contains at least one processor, a means of network access that interacts with the at least one processor, an information storage medium containing an operating system (such as the Windows™ OS), as well as a group of instructions which, when executed on the at least one processor, realize the method of recognizing an email 210 as spam.

In a particular aspect, the system designed to implement the method of recognizing an email 210 as spam includes: a computer device 200 that contains spam filter 220, signature analyzer 230, database of spam signatures 240, and classifier 100.

In one embodiment of this invention, spam filter 220, signature analyzer 230 and database of spam signatures 240 are modules of a security application (such as an antivirus application), installed on the operating system of computer device 200. Spam filter 220 is configured to make decisions as to whether email 210 belongs to spam. For this purpose, spam filter 220 uses signature analyzer 230 and classifier 100. In one embodiment, classifier 100 is implemented on a remote server, and spam filter 220 interacts with classifier 100 through a network (such as the Internet 250).

In another embodiment, classifier 100 as well as spam filter 220 are modules of a security application (such as an antivirus application), installed on the operating system of the computer device 200.

Database of spam signatures 240 contains regularly updated databases of signatures of spam emails (hereinafter, spam signatures or simply signatures), to be used by signature analyzer 230 to determine whether an email 210 belongs to spam. signature analyzer 230 may be configured to extract the signature of email 210 and compare the extracted signature with a plurality of spam signatures found in database 240. Database of spam signatures 240 is composed at least in part from the signatures of spam emails that ended up in the spam traps.

A spam signature is a hash of a certain part of a spam email. The part may be a value of a header, a sequence of headers and/or the content (in the body of the email). In some aspects, signatures are formed from a predetermined sequence of header values, since calculating a hash from header values requires significantly less computational resources than computing a hash from the contents of an email. Suppose a spam email contains a sequence of headers consisting of 9 fields: F1, F2, F3, F5, F8, F9, F10, F15 and F20, where F—corresponds to the field "heading," and the number indicates the type of field in a certain classification. For example, F1 corresponds to the "from" field, and F2—"to", F3—"subject", F5—"attach", F8—"x-mailer", F9—"ss", F10—"content-type", F15 is "date" and F20 is "message-id". Only six fields are used to generate spam signatures, from the values of which the sequence F1F3F5F8F10F15 is formed. For this sequence, the hash value of the function is calculated (e.g., using MD5), and the result is a spam signature of the form "c72c4c829a3863d1056634d3a306871f".

In response to receiving email 210, from a client of a user, at computer system 200, spam filter 220 examines email 210 with the aid of signature analyzer 230, which compares a signature of email 210 to the currently available spam signatures in database of spam signatures 240. If, from the results of the check, no match was found between email 210 and any of the spam signatures, spam filter 220 sends at least two characteristics of email 210 to classifier 100. The characteristics are the value of the header(s) of the email 210 and the sequence of at least part of the headers of email 210.

Classifier 100 is configured to make a decision on whether to place email 210 in a spam repository. Classifier 100 does not use signatures to make the decision. Instead, classifier 100 determines the degree of similarity of the obtained characteristics of the email 210 to analogous characteristics of emails recognized as being spam by the method of signature analysis. Classifier 100 utilizes machine learning methods in which a neural network is trained with the data 150 (see FIG. 1) to receive an input set of characteristics and output a degree of similarity between email 310's characteristics and a spam email's characteristics.

In the present disclosure, the machine learning method does not make use of collections of "spam" or "not spam," as in traditional systems, but rather collections of "caught by spam signatures"/"not caught by spam signatures".

The use of collections of "spam"/"not spam" introduces a serious restriction for antispam vendors who check email on the servers of end users. The restriction being that it is difficult to find sufficiently large "white" collections (i.e., legitimate emails). Spam can be purchased, it can be collected in spam traps, and it can be exchanged with other antispam vendors. However, it is unlawful, and thus not possible, to provide "white" email (e.g., authentic emails of typical users) to third parties. This must be gathered independently, and it is practically impossible to assemble a large representative collection. In the present disclosure, the values of analogous characteristics (i.e., the set of characteristics which spam filter 220 sends to classifier 100) of other emails collected from all computer systems 160 by data collection and storage device 130 (e.g., KSN) are used as a "white" collection for the teaching. In this case, the size of the "white" collection is limited solely by the time of its gathering.

The model trained with such representative samples is able to place emails in a spam repository with high accuracy that are most similar in their characteristics to spam emails, although no spam signatures have been produced for them.

In some aspects, the degree of similarity determined by classifier 100 has numerical value. Spam filter 220 places email 210 in temporary quarantine in response to determining that the aforementioned degree of similarity exceeds a predetermined threshold having a numerical value (such as 0.7).

Before the expiration of the time allotted for quarantine, spam filter 220 will perform at least one further check of email 210 by the method of signature analysis (with the aid of Signature analyzer 230).

In one variant embodiment of the invention, spam filter 220 may perform yet another check of email 210 with the aid of signature analyzer 230 in response to determining that at least one new signature has appeared in database of spam signatures 240. Spam filter 220 may recognize email 210 as spam if this additional check has yielded a positive result. In other words, email 210 is recognized as being spam by the spam filter 220 if, in the time allotted for quarantine, signature analyzer 230 has received a spam signature (or updated existing one) matching a signature of email 210.

Figure 3:
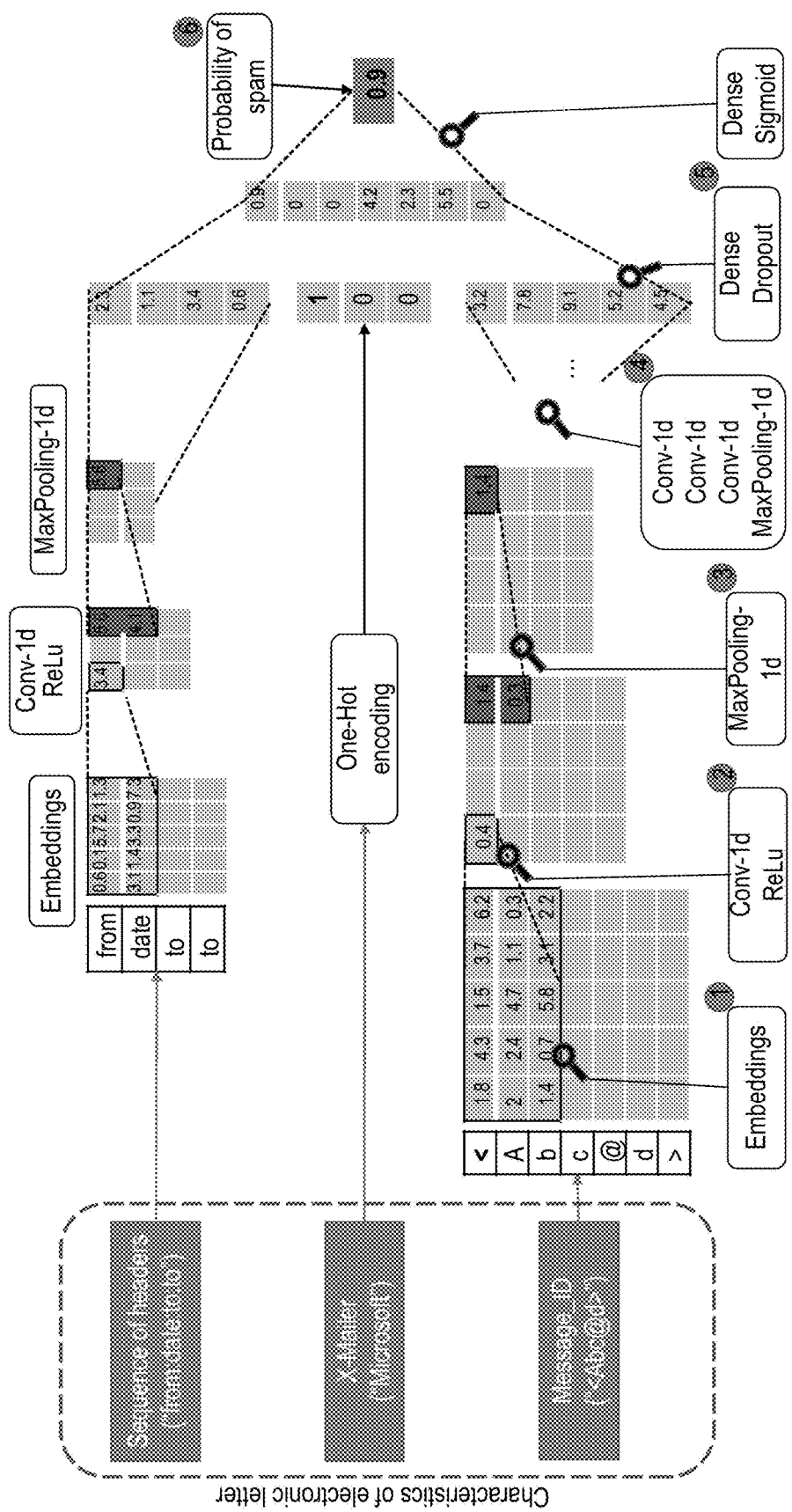
FIG. 3 illustrates an example of the analysis of the characteristics of an email with the aid of a classifier.

FIG. 3 shows an example of the analysis of the fields of email 210 performed by classifier 100 to determine whether to place email 210 in a spam repository.

The present disclosure comprises classifier 100, which is based on deep learning methods. Due to the large volume of data and the deep architecture of the model, the algorithm embedded in the classifier is able to automatically identify nontrivial attributes from the incoming data for a more accurate classification of spam.

As depicted in FIG. 3, the inputs for classifier 100 are the characteristics of email 210, such as the values of the headers "Message_ID" and "X-mailer," and also the sequence of headers of the email. Each of these characteristics go through several stages of identification of attributes (1-4), which influence the final decision of classifier 100.

In reference to "Message_ID," in the first stage, each character of the value of the header "Message_ID" is identified as a sequence of numbers of fixed length (e.g., 90 characters) forming a matrix of dimension 80×90. Classifier 100 feeds the obtained matrix into a unidimensional convolution layer (Cony-1d, from 1D Convolution). At this layer, 64 filters of dimension 5 are created (ReLu, from Rectified Linear Unit), which are applied, by classifier 100, step by step to the subsequences of "Message_ID" in order to identify the patterns from them (2).

In a given case, broader filters may be used in order to obtain attributes from subsequences of greater length. The resulting matrix has a dimension of 76×64. In order to avoid instances where slight changes in "Message_ID," such as a shifting of characters, significantly alter the resulting matrix, the unidirectional layer MaxPooling-1d is then used (3) by classifier 100. This layer takes the maximum from the values in a given window. In the given example of FIG. 3, a window of dimension 5 is used with a step equaling 3 (i.e., the window is shifted by 3 cells each time over the 76×64 matrix). The dimension of the resulting matrix is equal to 26×64. Next, several unidirectional convolution layers are applied in succession, each of which has 64 filters of dimension 3, after which the unidirectional MaxPooling is applied (4) with a window size equaling 3 and a step of 3. The resulting matrix of dimension 6×64 is expanded into a vector of length 338.

In terms of sequence of headers input into classifier 100, processing is analogous to "Message_ID," with the exception of the number of layers and input data. Instead of characters, as was the case for "Message_ID," the names of the headers are identified as a sequence of numbers. The resulting matrix of dimension 10×20 goes through one convolution layer and one MaxPooling layer. The resulting matrix has a dimension of 2×16 and is expanded into a vector of length 32.

In terms of the header "X-Mailer," since the values of the header "X-Mailer" are a category of characteristics of the email, classifier 100 generates the vector representation of such data using unitary code (one-hot Encoding)—a binary code of fixed length, containing only one 1—forward unitary code, or only one 0—reverse unitary code. The length of the code is determined by classifier 100 based on the number of objects being encoded, that is, each object corresponds to a separate code bit, and the value of the code is determined by the position 1 or 0 in the code word. The resulting vector has a dimension of 29 and consists of zeroes and one unit, showing the category of "X-Mailer."

The identified attributes for each characteristic are combined and go through several further steps of transformation (5) in order to allow for correlations between the input values. In FIG. 3, classifier 100 applies a dense dropout, which is a method of regularization in artificial neural networks designed to prevent over-training of the networks. The essence of the method is that, in the training process, a layer is selected from which a certain number of neurons (such as 30%) are randomly discarded, being excluded from the further computations. Then, after the exclusion, an activation function (e.g., a Dense Sigmoid) is used, putting out a number between 0 and 1. The output of classifier 100 is interpreted as the probability of spam (6) or as the degree of similarity of the characteristics of email 210 to the characteristics of spam. The numerical indicator put out is compared by spam filter 220 with a previously determined threshold value for making the decision whether to send email 210 to a spam repository.

In one variant embodiment, each email is characterized not by a binary characteristic (spam/not spam), but by a certain weight (W) in a given range (such as 0 . . . 1), and the time spent by the email in quarantine is determined by spam filter 220 depending on the weight. The weight can be an indicator of the probability of spam as calculated by the classifier 100. For example, spam filter 220 may classify email 210 as spam in response to determining that the weight is less than a first threshold R1 (e.g., 0.2) and may classify email 210 as not spam in response to determining that the weight is greater than a second threshold R2 (e.g., 0.9). Spam filter 220 may receive the weight from classifier 100 and determine the time in quarantine by the following formula, $$t = 1 \text{ minute} + e^{\frac{(w-R1)}{(R2-R1)}}.$$

Figure 4:
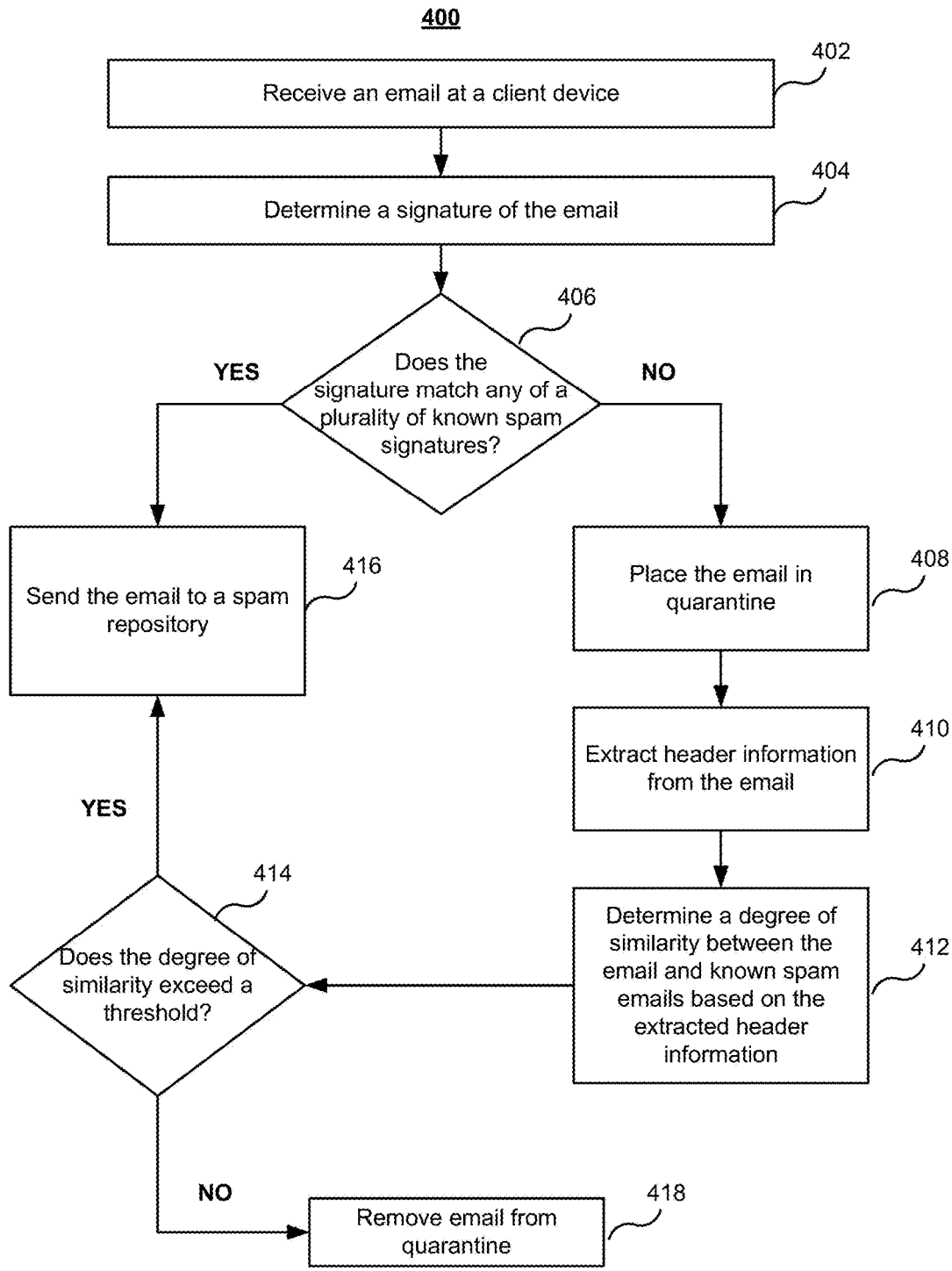
FIG. 4 illustrates a flow diagram of a method for spam identification and removal in accordance with aspects of the present disclosure.

FIG. 4 illustrates a flow diagram of method 400 for spam identification and removal in accordance with aspects of the present disclosure. At 402, spam filter module (e.g., spam filter 220) receives an email at a client device. At 404, spam filter module determines a signature of the email. At 406, spam filter module determines whether the signature matches any of a plurality of known spam signatures. In response to determining that no match exists, method 400 proceeds to 408, where spam filter module places the email in quarantine. If a match does exist (i.e., the email is indeed spam), method 400 proceeds to 416, where spam filter module sends the email to a spam repository (i.e., making it usually inaccessible to a user of the client device). From 408, method 400 proceeds to 410, where spam classifier module (e.g., classifier 100) extracts header information from the email. At 412, spam classifier module determines a degree of similarity between the email and known spam emails based on the extracted header information—particularly using a neural network described in FIG. 3. At 414, spam filter module determines whether the degree of similarity exceeds a threshold. In response to determining that the degree of similarity does not exceed a threshold (indicating to spam filter module that the email is not spam), method 400 proceeds to 418, where spam filter module removes the email from quarantine. If the degree of similarity is determined to exceed the threshold at 414 (indicating to spam filter module that the email is spam), method 400 ends at 416, where spam filter module sends the email to a spam repository. In some embodiments, spam filter module may then add the signature of the email to the plurality of known spam signatures (if it already does not exist there).

Figure 5:
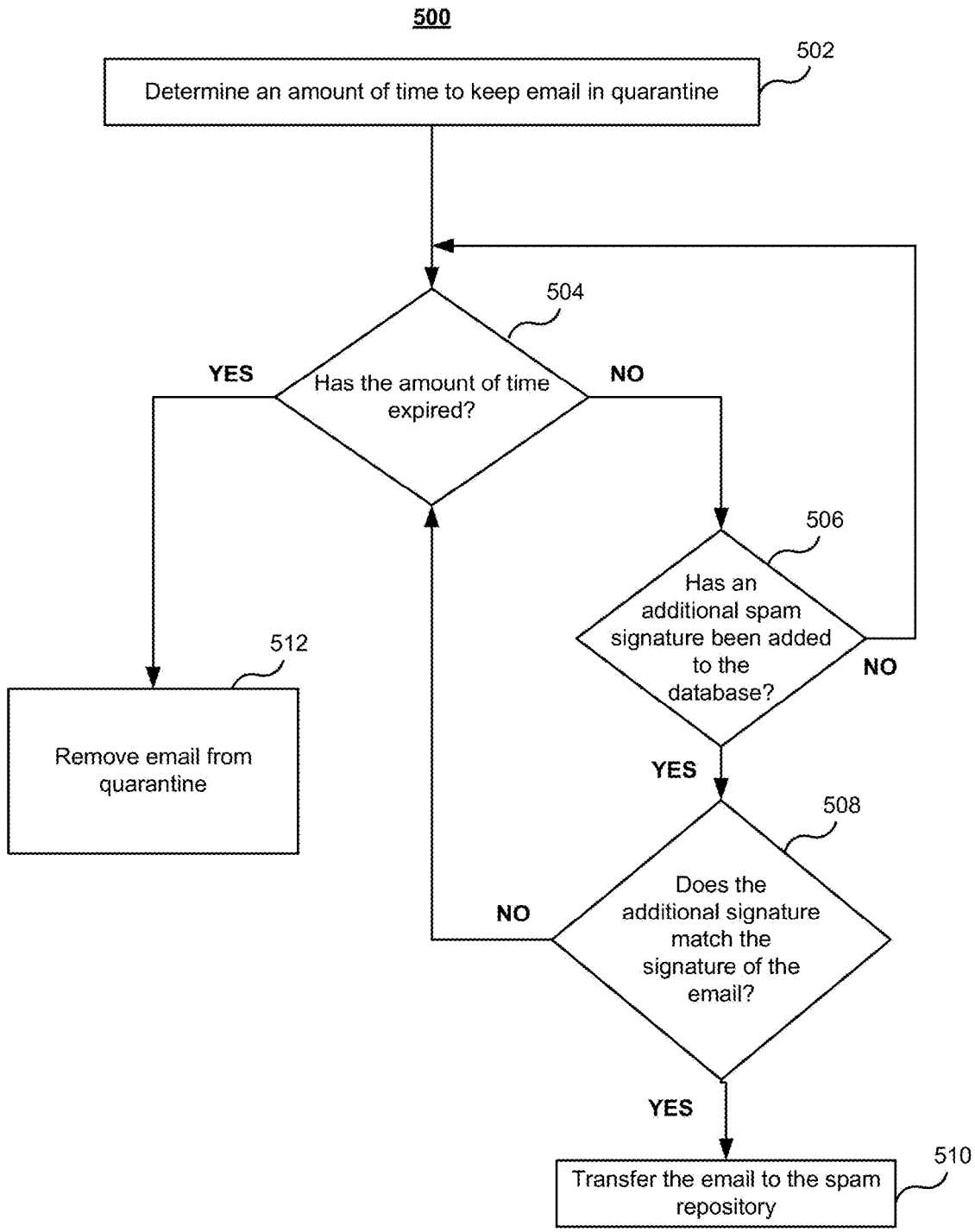
FIG. 5 illustrates a flow diagram of a method for spam removal whilst in quarantine, in accordance with aspects of the present disclosure.

FIG. 5 illustrates a flow diagram of method 500 for spam removal whilst in quarantine, in accordance with aspects of the present disclosure. At 502, spam filter module determines an amount of time to keep the email in quarantine (e.g., based on the degree of similarity which serves as a weight). At 504, spam filter module monitors whether the amount of time has expired. Simultaneously at 506, spam filter module determines whether an additional spam signature has been added to the database comprising the plurality of known spam signatures (e.g., database 240). In response to determining that an additional spam signature has not been added, method 500 returns to 504 (this loop occurs until the amount of time expires). If at 506, spam filter module determines that an additional spam signature has been added, at 508, spam filter module determines whether the additional spam signature matches the signature of the email. In response to determining a match (i.e., indicating to spam filter module that the email is spam), method 500 proceeds to 510, where spam filter module transfers the email to the spam repository. If a match is not found, method 500 returns to 504. If at 504, it is determined by spam filter module that the amount of time has expired, method 500 ends at 512, where spam filter module removes the email from quarantine (thus making it accessible to the user of the client device).

FIG. 6 is a block diagram illustrating a computer system 20 on which aspects of systems and methods for spam identification may be implemented in accordance with an exemplary aspect. The computer system 20 may represent device 130, clients 110A, B, etc., and computer system 200 from FIGS. 1 and 2 and can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable code implementing the techniques of the present disclosure. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system. Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for identification of spam emails, the method comprising:
   receiving an email at a client device;
   determining a signature of the email;
   comparing the determined signature with a plurality of spam signatures stored in a database; and
   in response to determining that no match exists between the determined signature and the plurality of spam signatures:
      placing the email in quarantine;
      extracting a sequence of headers of the email;
      determining a degree of similarity between known spam emails and the email, using a machine learning method configured to generate the degree of similarity based on the sequence of headers;
      determining an amount of time to keep the email in quarantine, wherein the amount of time is proportional to the degree of similarity;
      in response to determining that the degree of similarity between the spam emails and the email does not exceed a threshold, removing the email from the quarantine; and
      in response to determining that the degree of similarity between the spam emails and the email exceeds the threshold and the amount of time to keep the email in quarantine has not expired, transferring the email from the quarantine to a spam repository such that the email is inaccessible to a user of the client device, wherein the spam repository is on a server different from the server being used for quarantining emails, and adding the signature of the email to the plurality of spam signatures stored in the database.

2. The method of claim 1, further comprising:
   in response to determining that (1) an additional spam signature has been added to the database comprising the plurality of spam signatures and (2) the amount of time to keep the email in the quarantine has not expired, comparing the determined signature with the additional spam signature.

3. The method of claim 1, further comprising:
   in response to determining that the amount of time to keep the email in the quarantine has expired, removing the email from quarantine.

4. The method of claim 1, wherein the sequence of headers comprises a value of at least one header of the email and a sequence of the at least one header.

5. The method of claim 4, wherein the at least one header comprises Message ID and X_mailer.

6. The method of claim 1, wherein the machine learning method is a neural network trained to determine the degree of similarity using a first set of emails classified as being caught by spam signatures and a second set of emails classified as not caught by spam signatures.

7. A system for identification of spam emails, the system comprising:
   a hardware processor configured to:
      receive an email at a client device;
      determine a signature of the email;
      compare the determined signature with a plurality of spam signatures stored in a database; and
      in response to determining that no match exists between the determined signature and the plurality of spam signatures:
         place the email in quarantine;
         extract a sequence of headers of the email;
         determine a degree of similarity between known spam emails and the email, using a machine learning method configured to generate the degree of similarity based on the sequence of headers;
         determine an amount of time to keep the email in quarantine, wherein the amount of time is proportional to the degree of similarity;
         in response to determining that the degree of similarity between the spam emails and the email does not exceed a threshold, remove the email from the quarantine; and
         in response to determining that the degree of similarity between the spam emails and the email exceeds the threshold and the amount of time to keep the email in quarantine has not expired, transfer the email from the quarantine to a spam repository such that the email is inaccessible to a user of the client device, wherein the spam repository is on a server different from the server being used for quarantining emails, and add the signature of the email to the plurality of spam signatures stored in the database.

8. The system of claim 7, the hardware processor is further configured to:
in response to determining that (1) an additional spam signature has been added to the database comprising the plurality of spam signatures and (2) the amount of time to keep the email in the quarantine has not expired, compare the determined signature with the additional spam signature.

9. The system of claim 7, the hardware processor is further configured to:
in response to determining that the amount of time to keep the email in the quarantine has expired, remove the email from quarantine.

10. The system of claim 7, wherein the sequence of headers comprises a value of at least one header of the email and a sequence of the at least one header.

11. The system of claim 10, wherein the at least one header comprises Message ID and X_mailer.

12. The system of claim 7, wherein the machine learning method is a neural network trained to determine the degree of similarity using a first set of emails classified as being caught by spam signatures and a second set of emails classified as not caught by spam signatures.

13. A non-transitory computer readable medium storing thereon computer executable instructions for identification of spam emails, including instructions for:
receiving an email at a client device;
determining a signature of the email;
comparing the determined signature with a plurality of spam signatures stored in a database; and
in response to determining that no match exists between the determined signature and the plurality of spam signatures:
placing the email in quarantine;
extracting a sequence of headers of the email;
determining a degree of similarity between known spam emails and the email, using a machine learning method configured to generate the degree of similarity based on the sequence of headers;
determining an amount of time to keep the email in quarantine, wherein the amount of time is proportional to the degree of similarity;
in response to determining that the degree of similarity between the spam emails and the email does not exceed a threshold, removing the email from the quarantine; and
in response to determining that the degree of similarity between the spam emails and the email exceeds the threshold and the amount of time to keep the email in quarantine has not expired, transferring the email from the quarantine to a spam repository such that the email is inaccessible to a user of the client device, wherein the spam repository is on a server different from the server being used for quarantining emails, and adding the signature of the email to the plurality of spam signatures stored in the database.

14. The non-transitory computer readable medium of claim 13, the instructions further comprising instructions for:
in response to determining that (1) an additional spam signature has been added to the database comprising the plurality of spam signatures and (2) the amount of time to keep the email in the quarantine has not expired, comparing the determined signature with the additional spam signature.

15. The non-transitory computer readable medium of claim 13, wherein the machine learning method is a neural network trained to determine the degree of similarity using a first set of emails classified as being caught by spam signatures and a second set of emails classified as not caught by spam signatures.

* * * * *

UNITED STATES PATENT AND TRADEMARK OFFICE
CERTIFICATE OF CORRECTION

| | | |
|---|---|---|
| PATENT NO. | : 11,929,969 B2 | Page 1 of 1 |
| APPLICATION NO. | : 16/673049 | |
| DATED | : March 12, 2024 | |
| INVENTOR(S) | : Nikita D Benkovich | |

It is certified that error appears in the above-identified patent and that said Letters Patent is hereby corrected as shown below:

On the Title Page

After Item (60), please insert the following:
-- (30) Foreign Application Priority Data
Jun. 28, 2019 (RU) ....................................... 2019122433 --.

Signed and Sealed this
Sixteenth Day of April, 2024

Katherine Kelly Vidal
*Director of the United States Patent and Trademark Office*